United States Patent
Zhang

(10) Patent No.: US 11,617,466 B2
(45) Date of Patent: Apr. 4, 2023

(54) JUICE PRESSING DEVICE

(71) Applicant: ZHEJIANG JIU KANG ELECTRIC APPLIANCES CO., LTD., Jiaxing (CN)

(72) Inventor: Guangli Zhang, Jiaxing (CN)

(73) Assignee: ZHEJIANG JIU KANG ELECTRIC APPLIANCES CO., LTD., Jiaxing (CN)

( * ) Notice: Subject to any disclaimer, the term of this patent is extended or adjusted under 35 U.S.C. 154(b) by 362 days.

(21) Appl. No.: 17/092,464

(22) Filed: Nov. 9, 2020

(65) Prior Publication Data

US 2021/0315407 A1    Oct. 14, 2021

(30) Foreign Application Priority Data

Apr. 14, 2020    (CN) .......................... 202020545610.0

(51) Int. Cl.
*A47J 19/02*    (2006.01)
*B30B 9/06*    (2006.01)

(52) U.S. Cl.
CPC ............... *A47J 19/023* (2018.08); *B30B 9/06* (2013.01)

(58) Field of Classification Search
CPC ................................ A47J 19/023; B30B 9/06
USPC ........................................................... 99/495
See application file for complete search history.

(56) References Cited

U.S. PATENT DOCUMENTS

| | | | | | |
|---|---|---|---|---|---|
| 2,022,206 | A | * | 11/1935 | Kammer | A47J 19/02 100/126 |
| 2,169,014 | A | * | 8/1939 | Aalborg | A47J 43/082 366/206 |
| 3,108,533 | A | * | 10/1963 | Read | A47J 19/02 100/98 R |
| 4,080,885 | A | * | 3/1978 | Pauty | A47J 19/023 D7/665 |
| 4,125,064 | A | * | 11/1978 | Ackeret | A47J 19/023 99/508 |
| 4,157,062 | A | * | 6/1979 | Ackeret | A47J 19/023 99/503 |
| 4,393,760 | A | * | 7/1983 | Hasegawa | A47J 19/025 100/145 |
| 4,440,074 | A | * | 4/1984 | Ihara | A47J 19/025 100/145 |
| 4,442,767 | A | * | 4/1984 | Johnson | A47J 19/02 100/116 |
| 4,490,335 | A | * | 12/1984 | Marev | C08B 37/0003 426/429 |
| 4,534,108 | A | * | 8/1985 | Yamamoto | A47J 19/023 7/152 |

(Continued)

*Primary Examiner* — Eric S Stapleton
(74) *Attorney, Agent, or Firm* — IPro, PLLC

(57) ABSTRACT

The disclosure relates to a juice pressing device having an outer cup, an inner tank component and a juice pressing component. The inner tank has a filter grid frame and an inner tank. The filter grid frame is fixed to the bottom end of the inner tank and is communicated with the inner tank. The inner tank with the assembled filter grid frame is inserted into the outer cup and fixed at the mouth of the outer cup. The juice pressing component has a pressing piece, a pressing shaft, a sealing cover of the inner tank and a pressing movable cover. One end of the pressing shaft is connected to the pressing movable cover, and the other end is connected to the pressing piece through a through hole in the center of the sealing cover of the inner tank.

9 Claims, 4 Drawing Sheets

(56) References Cited

U.S. PATENT DOCUMENTS

| | | | | |
|---|---|---|---|---|
| 5,035,174 A * | 7/1991 | Seal, Jr. | B30B 1/18 | 99/506 |
| 5,207,152 A * | 5/1993 | Wettlaufer | B30B 9/02 | 100/96 |
| 5,222,430 A * | 6/1993 | Wang | A47J 19/023 | 241/37.5 |
| 5,263,408 A * | 11/1993 | Blanchet | B30B 9/04 | 100/271 |
| 5,277,810 A * | 1/1994 | Shepard | B30B 9/06 | 210/493.1 |
| 5,771,791 A * | 6/1998 | Ling | A47J 19/027 | 241/37.5 |
| 5,906,153 A * | 5/1999 | Brinkmann | A23N 1/003 | 99/507 |
| 6,637,323 B2 * | 10/2003 | Kim | A47J 19/025 | 100/145 |
| 8,863,650 B2 * | 10/2014 | Lin | A47J 31/20 | 99/287 |
| 9,095,169 B1 * | 8/2015 | Foley | A23L 2/06 | |
| 2003/0154867 A1 * | 8/2003 | Kim | A47J 19/025 | 99/510 |
| 2005/0139091 A1 * | 6/2005 | Haverstock | A47J 31/20 | 99/495 |
| 2005/0139093 A1 * | 6/2005 | Nelson | B30B 9/06 | 100/37 |
| 2005/0199129 A1 * | 9/2005 | Glucksman | A47J 31/20 | 99/279 |
| 2006/0037480 A1 * | 2/2006 | Grant | A47J 41/00 | 99/275 |
| 2006/0169152 A1 * | 8/2006 | Lin | A47J 19/025 | 99/495 |
| 2007/0107608 A1 * | 5/2007 | Holcomb | A47J 19/023 | 99/495 |
| 2007/0277682 A1 * | 12/2007 | Wong | A47J 19/025 | 99/495 |
| 2009/0277335 A1 * | 11/2009 | Baccetti | A47J 31/20 | 426/433 |
| 2010/0005979 A1 * | 1/2010 | Baccetti | A47J 31/38 | 99/287 |
| 2010/0275785 A1 * | 11/2010 | Weissman | A47J 31/20 | 99/287 |
| 2010/0294135 A1 * | 11/2010 | Weissman | A47J 31/20 | 99/287 |
| 2011/0168644 A1 * | 7/2011 | Harris | C02F 1/002 | 210/236 |
| 2012/0097042 A1 * | 4/2012 | Lin | A47J 31/20 | 99/297 |
| 2012/0103203 A1 * | 5/2012 | Hensel | A47J 19/023 | 99/504 |
| 2012/0192728 A1 * | 8/2012 | Huang | A47J 19/027 | 99/511 |
| 2012/0292238 A1 * | 11/2012 | Wright | B01D 29/0029 | 210/257.2 |
| 2013/0000494 A1 * | 1/2013 | Wong | A47J 19/025 | 99/495 |
| 2013/0074707 A1 * | 3/2013 | Asbury | A47J 19/025 | 99/495 |
| 2013/0074708 A1 * | 3/2013 | Asbury | A47J 19/025 | 99/513 |
| 2013/0164423 A1 * | 6/2013 | Diatlo | A23L 2/04 | 426/489 |
| 2014/0231343 A1 * | 8/2014 | Jalet | A47J 17/04 | 210/541 |
| 2015/0359256 A1 * | 12/2015 | Wettlaufer | A23N 1/00 | 206/557 |
| 2016/0213052 A1 * | 7/2016 | Ali | H05B 6/80 | |
| 2017/0095122 A1 * | 4/2017 | Hoare | A23N 1/003 | |
| 2017/0251863 A1 * | 9/2017 | Murphy | B30B 9/04 | |
| 2018/0084818 A1 * | 3/2018 | Wettlaufer | B30B 9/06 | |
| 2018/0103676 A1 * | 4/2018 | Wettlaufer | B30B 9/045 | |
| 2018/0297309 A1 * | 10/2018 | Evans | B65D 85/8043 | |
| 2018/0339248 A1 * | 11/2018 | Chung | C02F 1/002 | |

* cited by examiner

JUICE PRESSING DEVICE

TECHNICAL FIELD

The present utility model relates to a food processing device, in particular relates to a juice pressing device.

BACKGROUND

At present, fresh fruit juice is usually made from fruit mixed with direct drinking water through a juicer or a cooking machine. Since there is no filter residue, the taste will be rough, especially for orange juice and corn juice with more crude fiber. In order to improve the taste, the filter grid is used to filter, and the static filtration method is usually used, which has low filtration efficiency and low juice yield. Therefore, the existing technology needs to be improved and developed.

SUMMARY

The technical problem to be solved by the present utility model is to provide a juice pressing device, the inner tank and the sealing cover of the inner tank form a sealing structure, and the compressed air is pressed under the pressing piece to press the juice above the filter grid out of the filter grid, so as to improve the juice output efficiency.

The technical scheme adopted by the present utility model to solve the above technical problems is to provide a juice pressing device, comprising a juice pressing device, comprising an outer cup, an inner tank component and a juice pressing component, the inner tank comprises a filter grid frame and an inner tank, the inner tank is in a cylindrical shape, the filter grid frame is fixedly connected with the bottom end of the inner tank and is communicated with the inner tank, the height of the inner tank of the assembled filter grid frame is less than the depth of the outer cup, the inner tank with the assembled filter grid frame is inserted into the outer cup and fixed at the mouth of the outer cup, the juice pressing component comprises a pressing piece, a pressing shaft, a sealing cover of the inner tank and a pressing movable cover, one end of the pressing shaft is connected to the pressing movable cover, and the other end is connected to the pressing piece through a through hole in the center of the sealing cover of the inner tank, the pressing piece is provided in the inner tank, and the sealing cover of the inner tank is provided at the top of the inner tank.

Further, the outer circumference of the pressing piece is provided with a sealing groove, the sealing groove is embedded with a sealing ring, the outer diameter of the pressing piece matches with the inner diameter of the inner tank, the sealing ring is used for sealing the pressing piece and the inner tank, and the material of the sealing ring is silica gel.

Further, the bottom of the filter grid frame is provided with a hemispherical filter grid, the bottom of the pressing piece is in a hemispherical shape matching with the filter grid, and the material of the filter grid is SUS304 stainless steel.

Further, the inner side of the filter grid frame is provided with a limit boss, and the bottom edge of the pressing piece is provided with a limit protuberance, when the pressing piece reaches the bottom end under the pushing force of the pressing movable cover, the limit protuberance butts against the limit boss.

Further, the filter grid frame is threaded with the inner tank, the outer circumference of the bottom of the inner tank is provided with a lower thread, the inner circumference of the filter grid frame is provided with an internal thread matching with the lower thread; the sealing cover of the inner tank is threaded with the inner tank, the outer circumference of the top of the inner tank is provided with an upper thread, and an inner thread matching with the upper thread is provided on the inner sleeve sealing cove sealing cover of the inner tank.

Further, the inner tank is fixed at the mouth of the outer cup through fixing pins of the inner tank, the fixing pins of the inner tank is multiple, and the material of the fixing pins of the inner tank is PE plastic.

Further, the outer cup is provided with a spout with acute angle, and the spout is an anti-overflow spout.

Further, the bottom of the outer cup is provided with a bottom fixing bracket, and the foot of the bottom fixing bracket is provided with an anti-skid rubber pad.

Further, the outer cup is provided with a handle, and a handle button is provided on the handle.

Further, the material of the sealing cover of the inner tank is PC plastic, the material of the pressing shaft is stainless steel, the material of the pressing piece is PP plastic, the material of the filter grid frame is PE plastic, the material of the inner tank is transparent PE plastic, and the material of the outer cup is transparent PPO plastic.

Compared with the prior art, the present utility model has the following beneficial effects: the juice pressing device provided by the present utility model, the inner tank and the sealing cover of the inner tank of the utility model form a sealed inner cavity structure, under the pressure of the piston type pressing piece, the juice above the filter grid is pressed out from the filter grid, with high juice output efficiency, stable juice output and no leakage. The inner tank is threaded with the sealing cover of the inner tank and the filter grid, so the sealing effect is better; the silicone food grade sealing ring of the pressing piece has good sealing effect and is durable; different filter grids are selected by changing the filter grid frame, and the juice concentration and dilution can be selected at will; the pressing shaft is made of high-strength stainless steel, and does not bend during high-frequency use; the multi angle acute angle spout ensures that the juice does not overflow.

| | | |
|---|---|---|
| 1. a pressing movable cover | 2. a pressing shaft | 3. a sealing cover of the inner tank |
| 4. a inner tank | 5. fixing pins of the inner tank | 6. a sealing ring |
| 7. a pressing piece | 8. a filter grid frame | 9. an outer cup |
| 10. a bottom fixing bracket | 11. an anti-skid rubber pad | 12. a handle button |
| 13. a handle | | |

DETAILED DESCRIPTION

The present utility model will be further described below with reference to the drawings and embodiments.

Figure 1:
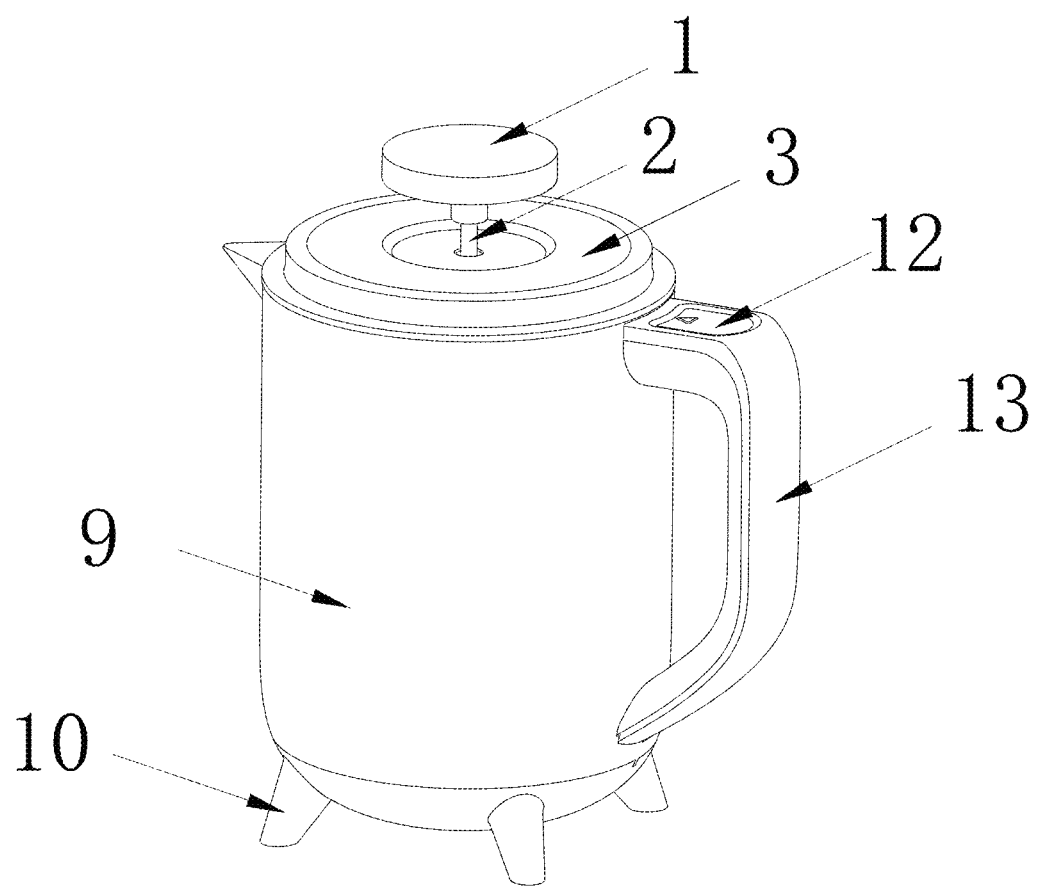
FIG. 1 is a schematic view illustrating the structure of the juice pressing device according to one embodiment of the present utility model.
Figure 2:
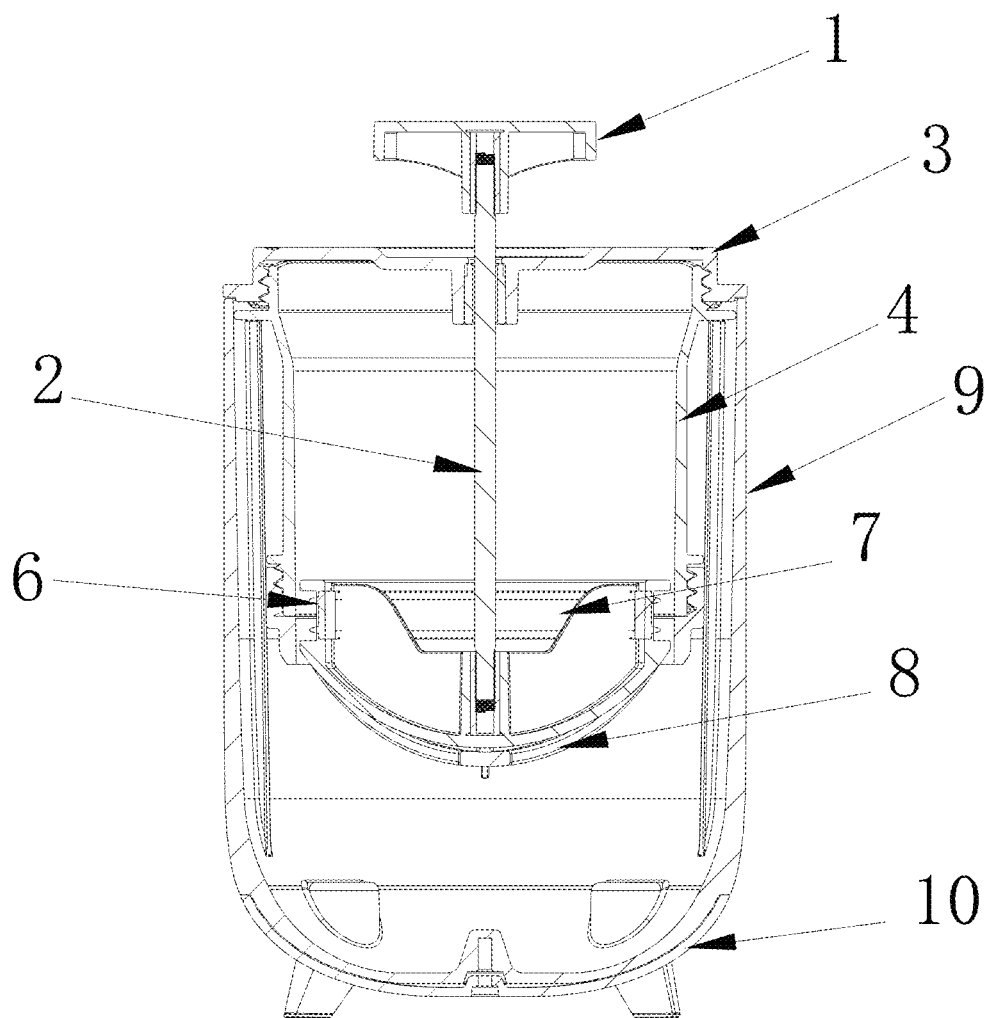
FIG. 2 is a side sectional view of the juice pressing device according to one embodiment of the present utility model.
Figure 3A:
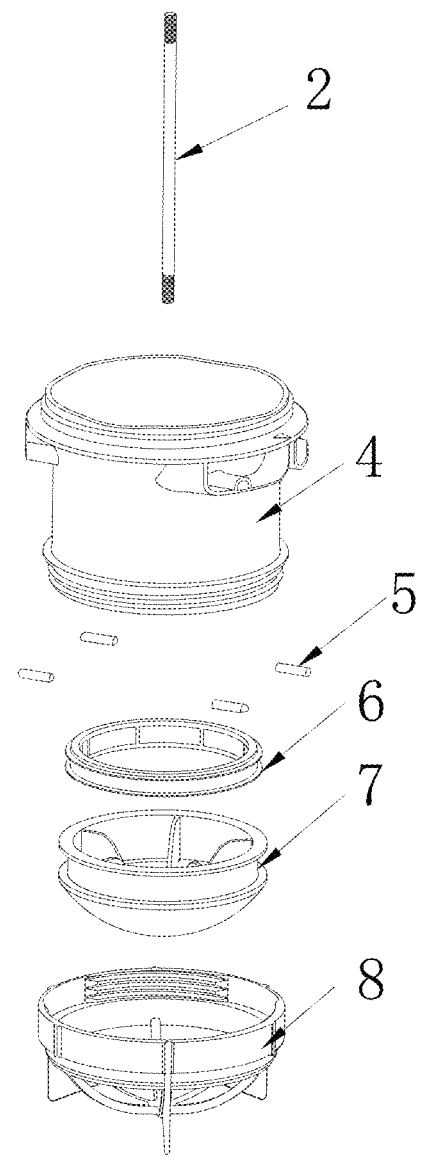
FIG. 3A-3B is an exploded view of the juice pressing device according to one embodiment of the present utility model.
Figure 3B:
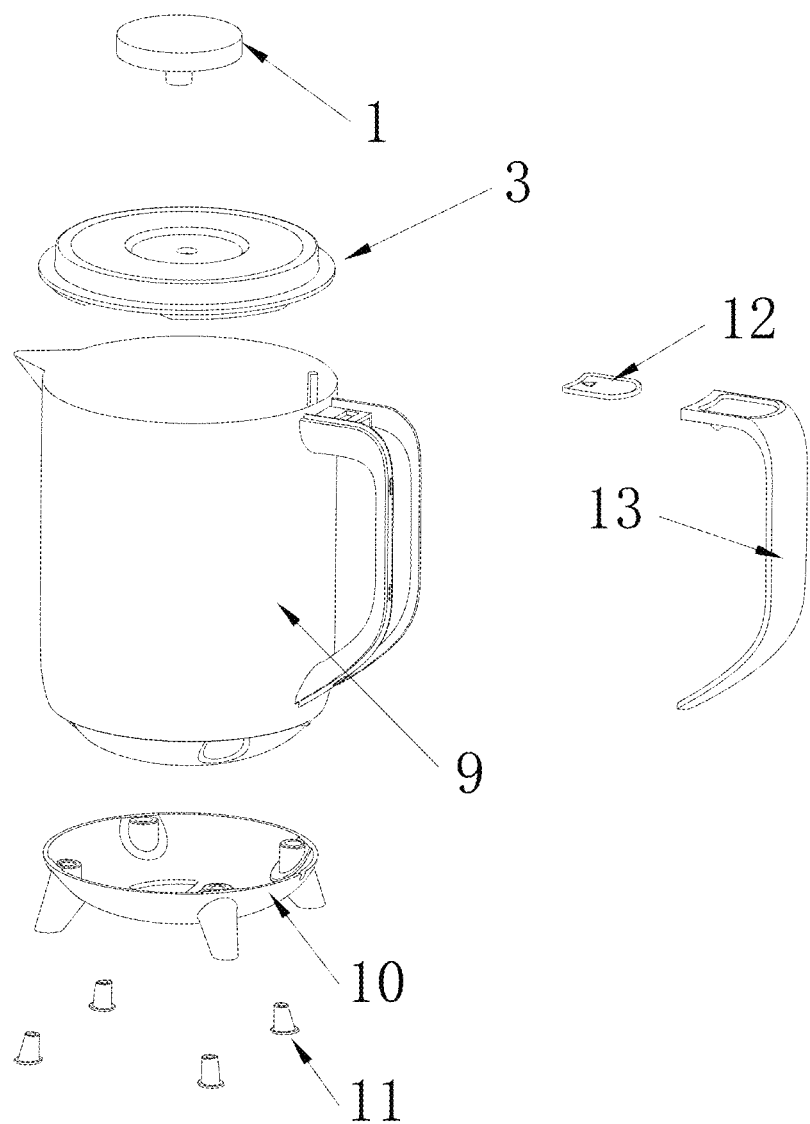

FIG. 1 is a schematic view illustrating the structure of the juice pressing device according to one embodiment of the present utility model. FIG. 2 is a side sectional view of the juice pressing device according to one embodiment of the present utility model. FIG. 3A-3B is an exploded view of the juice pressing device according to one embodiment of the present utility model.

Please refer to FIG. 1, FIG. 2 and FIG. 3A-3B, the juice pressing device of the present utility model, comprising an outer cup 9, an inner tank component and a juice pressing component, the inner tank comprises a filter grid frame 8 and an inner tank 4, the inner tank 4 is in a cylindrical shape, the filter grid frame 8 is fixedly connected with the bottom end of the inner tank 4 and is communicated with the inner tank 4, the height of the inner tank 4 of the assembled filter grid frame 8 is less than the depth of the outer cup 9, the inner tank 4 with the assembled filter grid frame 8 is inserted into the outer cup 9 and fixed at the mouth of the outer cup, the juice pressing component comprises a pressing piece 7, a pressing shaft 2, a sealing cover of the inner tank 3 and a pressing movable cover 1, one end of the pressing shaft 2 is connected to the pressing movable cover 1, and the other end is connected to the pressing piece 7 through a through hole in the center of the sealing cover of the inner tank 3, the pressing piece 7 is provided in the inner tank, and the sealing cover of the inner tank 3 is provided at the top of the inner tank 4.

Please continue refer to FIG. 2 and FIG. 3A-3B, the juice pressing device of the present utility model, the outer circumference of the pressing piece 7 is provided with a sealing groove, the sealing groove is embedded with a sealing ring 6, the outer diameter of the pressing piece 7 matches with the inner diameter of the inner tank 4, the sealing ring 6 is used for sealing the pressing piece and the inner tank 4, and the material of the sealing ring 6 is silica gel. The sealing effect is good and the juice pressing device is durable.

Specifically, the juice pressing device of the present utility model, the bottom of the filter grid frame 8 is provided with a hemispherical filter grid, the bottom of the pressing piece 7 is in a hemispherical shape matching with the filter grid which can enlarge the filter grid area and improve the filtration efficiency, and the material of the filter grid is SUS304 stainless steel which can be durable. The inner side of the filter grid frame 8 is provided with a limit boss, and the bottom edge of the pressing piece 7 is provided with a limit protuberance, when the pressing piece reaches the bottom end under the pushing force of the pressing movable cover, the limit protuberance butts against the limit boss which can prevent the pressing piece 7 from squeezing the filter grid, causing damage to the filter grid and the filter grid frame 8.

Specifically, the juice pressing device of the present utility model, the filter grid frame 8 is threaded with the inner tank 4, the outer circumference of the bottom of the inner tank 4 is provided with a lower thread, the inner circumference of the filter grid frame 8 is provided with an internal thread matching with the lower thread; the sealing cover of the inner tank 3 is threaded with the inner tank 4, the outer circumference of the top of the inner tank 4 is provided with an upper thread, and an inner thread matching with the upper thread is provided on the inner sleeve sealing cove sealing cover of the inner tank 3.

Specifically, the juice pressing device of the present utility model, the inner tank 4 is fixed at the mouth of the outer cup 9 through fixing pins of the inner tank 5, the fixing pins of the inner tank 5 is multiple, and the material of the fixing pins of the inner tank 5 is PE plastic.

Preferably, the outer cup 9 is provided with a spout with acute angle, and the spout is an anti-overflow spout which facilitates the pouring of the filtered juice.

Preferably, the bottom of the outer cup 9 is provided with a bottom fixing bracket 10, and the foot of the bottom fixing bracket 10 is provided with an anti-skid rubber pad which are not easy to slide during operation.

Preferably, the outer cup 9 is provided with a handle 13, and a handle button 12 is provided on the handle 13 which is convenient to hold and used for decoration.

Preferably, the material of the pressing shaft 2 is stainless steel which will not bend in high frequency use, the material of the sealing cover of the inner tank 3 is PC plastic, the material of the pressing piece 7 is PP plastic, the material of the filter grid frame is PE plastic, the material of the inner tank 4 is transparent PE plastic, and the material of the outer cup 9 is transparent PPO plastic which is convenient for observing the pressing state.

The juice pressing device of the present utility model, in actual use, it is used with a juicer or a food processor. The inner tank 4 of the assembled filter grid frame 8 is placed in the outer cup and fixed; the juice pressing assembly is assembled, and the sealing ring 6 is set on the pressing piece 7. One end of the pressing shaft 2 is connected to the pressing movable cover 1, and the other end passes through the through hole in the center of the sealing cover of the inner tank 3 to connect to the pressing piece 7; pouring the filtered juice into the inner tank 4, and the pressing piece 7 is set in the inner tank, and tightening the sealing cover of the inner tank 3 to the top of the inner tank 4, pressing the pressing movable cover 1, and drive the pressing piece 7 to move down the compressed air to press the juice on the filter grid to the outside cup 9.

In summary, the juice pressing device provided by the present utility model, the inner tank 4 and the sealing cover of the inner tank 3 of the utility model form a sealed inner cavity structure, under the pressure of the piston type pressing piece 7, the juice above the filter grid is pressed out from the filter grid, with high juice output efficiency, stable juice output and no leakage. The inner tank 4 is threaded with the sealing cover of the inner tank 3 and the filter grid 8, so the sealing effect is better; the silicone food grade sealing ring 6 of the pressing piece 7 has good sealing effect and is durable; different filter grids are selected by changing the filter grid frame, and the juice concentration and dilution can be selected at will; the pressing shaft 2 is made of high-strength stainless steel, and does not bend during high-frequency use; the multi angle acute angle spout ensures that the juice does not overflow.

Although the present utility model has been disclosed as above in preferred embodiments, it is not intended to limit the present utility model. Any person skilled in the art can make some modifications and improvements without departing from the spirit and scope of the utility model. Therefore, the protection scope of the present utility model should be defined by the claims.

What is claimed is:

1. A juice pressing device, wherein comprising a juice pressing device, comprising an outer cup, an inner tank component and a juice pressing component, the inner tank comprises a filter grid frame and an inner tank, the inner tank is in a cylindrical shape, the filter grid frame is fixedly connected with the bottom end of the inner tank and is communicated with the inner tank, the height of the inner tank of the assembled filter grid frame is less than the depth of the outer cup, the inner tank with the assembled filter grid frame is inserted into the outer cup and fixed at the mouth of the outer cup, the juice pressing component comprises a pressing piece, a pressing shaft, a sealing cover of the inner tank and a pressing movable cover, one end of the pressing shaft is connected to the pressing movable cover, and the other end is connected to the pressing piece through a through hole in the center of the sealing cover of the inner tank, the pressing piece is provided in the inner tank, and the sealing cover of the inner tank is provided at the top of the inner tank;

wherein the filter grid frame is threaded with the inner tank, the outer circumference of the bottom of the inner tank is provided with a lower thread, the inner circumference of the filter grid frame is provided with an internal thread matching with the lower thread;

wherein the sealing cover of the inner tank is threaded with the inner tank, the outer circumference of the top of the inner tank is provided with an upper thread, and an inner thread matching with the upper thread is provided on the sealing cover of the inner tank.

2. The juice pressing device according to claim 1, wherein the outer circumference of the pressing piece is provided with a sealing groove, the sealing groove is embedded with a sealing ring, the outer diameter of the pressing piece matches with the inner diameter of the inner tank, the sealing ring is used for sealing the pressing piece and the inner tank, and the material of the sealing ring is silica gel.

3. The juice pressing device according to claim 1, wherein the bottom of the filter grid frame is provided with a hemispherical filter grid, the bottom of the pressing piece is in a hemispherical shape matching with the filter grid, and the material of the filter grid is SUS304 stainless steel.

4. The juice pressing device according to claim 1, wherein the inner side of the filter grid frame is provided with a limit boss, and the bottom edge of the pressing piece is provided with a limit protuberance, when the pressing piece reaches the bottom end under the pushing force of the pressing movable cover, the limit protuberance butts against the limit boss.

5. The juice pressing device according to claim 1, wherein the inner tank is fixed at the mouth of the outer cup through fixing pins of the inner tank, the fixing pins of the inner tank is multiple, and the material of the fixing pins of the inner tank is PE plastic.

6. The juice pressing device according to claim 1, wherein the outer cup is provided with a spout with acute angle, and the spout is an anti-overflow spout.

7. The juice pressing device according to claim 1, wherein the bottom of the outer cup is provided with a bottom fixing bracket, and the foot of the bottom fixing bracket is provided with an anti-skid rubber pad.

8. The juice pressing device according to claim 1, wherein the outer cup is provided with a handle, and a handle button is provided on the handle.

9. The juice pressing device according to claim 1, wherein the material of the sealing cover of the inner tank is PC plastic, the material of the pressing shaft is stainless steel, the material of the pressing piece is PP plastic, the material of the filter grid frame is PE plastic, the material of the inner tank is transparent PE plastic, and the material of the outer cup is transparent PPO plastic.

\* \* \* \* \*